C. A. SANDS.
HOP-POLE.
No. 185,263. Patented Dec. 12, 1876.
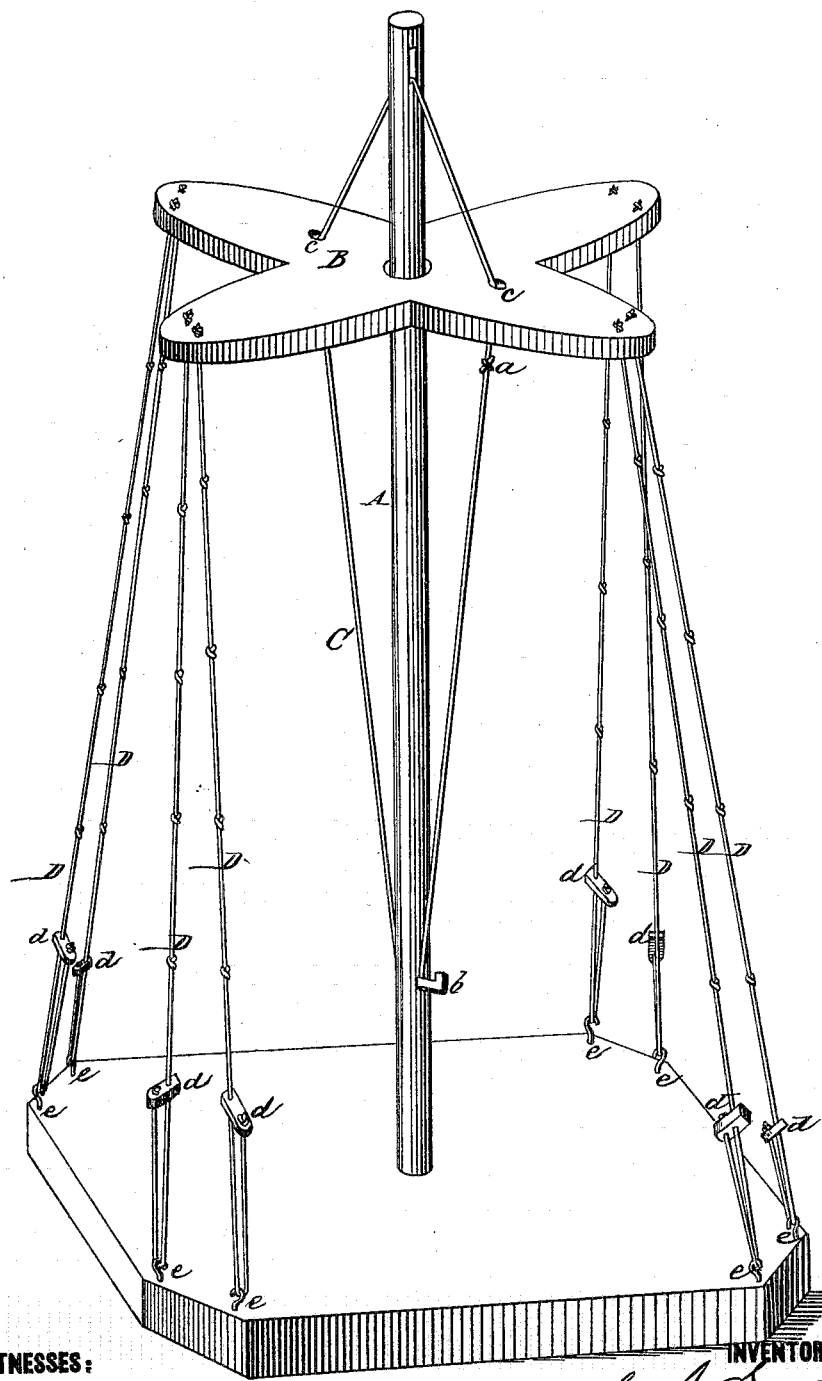

UNITED STATES PATENT OFFICE.

CHARLES A. SANDS, OF BURLINGTON, KANSAS.

IMPROVEMENT IN HOP-POLES.

Specification forming part of Letters Patent No. 185,263, dated December 12, 1876; application filed November 11, 1876.

*To all whom it may concern:*

Be it known that I, CHARLES A. SANDS, of Burlington, in the county of Coffey and State of Kansas, have invented a new and Improved Hop-Pole, of which the following is a specification:

My invention consists of a central pole that is permanently set in the earth, upon which slides a cross-head or set of radial arms, to the outer extremities of which knotted ropes or wires are attached, that are held at their lower ends by hooks fixed in stakes driven in the earth. The pole is provided with a rope for raising the cross-head, and the ropes are furnished with friction-blocks for the purpose of holding them taut.

Referring to the drawing, which is a perspective view, A is a pole, set permanently in the earth, and B is a cross-head, or set of radial arms, that are attached together, and bored centrally to fit the pole A loosely. C is a rope that passes through sheaves near the upper and lower ends of the pole, and also through openings $c$ in the cross-head B. A knot, $a$, is made in the rope C, by means of which the cross-head B is raised. A key, $b$, is forced into the lower opening in the pole A, for the purpose of holding the rope C in any desired position. Knotted ropes or wires D D are attached to the ends of the arms of the cross-head B, and run downward through blocks $d$, forming loops, that are engaged by hooks $e$, that are attached to stakes driven in the ground near the hills of hops.

The cross-head B is raised by means of the rope C, when it is desired to make the ropes or wires D taut. It is lowered by the same means for convenience in picking. The blocks $d$ may also be used for tightening the ropes.

The advantages claimed for my invention are, the security in heavy winds, the ropes acting as guys for the poles.

The arrangement of the poles and ropes is such that the poles may be left standing, as they are not in the way of the plow in the yearly cultivation of the hops.

The labor of taking down the poles at picking time, and stacking them for the winter, and replacing them in the spring, is entirely avoided.

Having thus described my invention, I claim as new and desire to secure by Letters Patent—

The combination of the pole A, having sheaves near its upper and lower ends, the cross-head B, having holes $c$, the ropes or wires C and D D, blocks $d$, and hooks $e$, substantially as herein shown and described.

CHARLES A. SANDS.

Witnesses:
JOB THROCKMORTON,
WM. H. BEAR.